United States Patent Office 2,795,568
Patented June 11, 1957

2,795,568

MODIFIED CLAYS

Robert A. Ruehrwein, Dayton, Ohio, assignor to Monsanto Chemical Company, St. Louis, Mo., a corporation of Delaware No Drawing. Application April 14, 1953,
Serial No. 348,810

14 Claims. (Cl. 260—41)

This invention relates to modified expanding lattice clays. The invention in particular aspects involves the interaction of expanding lattice clays with certain polymeric organic materials.

Clays of the expanding lattice type are well-known industrial materials. They find use in a variety of applications. The individual particles or crystals of expanding lattice clays are flat, plate-like structures that expand considerably when contacted with water, the water molecules entering between the individual platelets and separating them from each other. Most of these clays are quite hydrophilic. For some uses, this is a very desirable property, whereas for other uses it would be desirable to reduce the hydrophilic qualities of the clays to a slight or to a considerable extent. Thus, for example, films can be made of expanding lattice clays, but such films are extremely sensitive to water. In various industrial applications a better dispersion and mixing of expanding lattice clays could be obtained if the clay were made less hydrophilic.

An object of this invention is to provide modified expanding lattice clays. Another object of the invention is to reduce the hydrophilic nature of expanding lattice clays. A further object of the invention is to provide new organo-expanding lattice clay adducts. A further object is to modify the surface characteristics of expanding lattice clays. Yet another object is to provide a composition of matter containing both inorganic and organic substituents. Another object is to make adducts of expanding lattice clays with organic materials wherein the organic portion is highly stable towards heat and other decomposing influences and is tightly bound to the clay. Other objects and advantages will be apparent to those skilled in the art from the accompanying disclosure and discussion.

In accordance with preferred aspects of the present invention, expanding lattice clays are modified by the action thereon of proton donor polymers containing a substantially linear carbon molecular chain derived by the polymerization of at least one monoolefinic compound through aliphatic unsaturation. Such proton donor polymers have labile hydrogen atoms that are capable of tying the polymer to the surfaces of expanding lattice clays by hydrogen bonding, the proton donor polymer providing the proton (hydrogen atom) which shares electrons with the acceptor, viz., the active part of the clay surface, presumably silicate oxygen atoms and/or hydroxyl groups on the surface of the clay plates.

The proton donor polymers with which this invention is concerned are high polymers, preferably having a molecular weight of at least 10,000; molecular weights above 15,000 are usually preferred. The molecular weight of suitable proton donor polymers is often in the range of 50,000 to 100,000 and even higher. However, low molecular weight proton donor polymers can be used in some instances, for example those having a molecular weight of say 5,000 or less preferably as little as 2,000 or even lower. Molecular weights referred to herein are those determined by the light scattering method described by Debye, Journal of Physics and Colloid Chemistry, 51, 18 (1947). Molecular weights determined by the light scattering method are weight average molecular weights; see Zimm and Doty, Journal of Chemical Physics, 12, 203 (1944). In practicing this invention the proton donor polymers are believed to become bound to the surfaces of the clay by hydrogen bonding, and by forces that are much greater than those binding low molecular weight proton donors, e. g., low molecular weight alcohols, to such surfaces.

Expanding lattice clays are well-known to those skilled in the art. These clays include minerals known and used commercially under the name "bentonite." This expression includes various expanding lattice minerals such as montmorillonite, hectorite, saponite, and nontronite, the crystals of which are flat, plate-like structures which expand appreciably in the presence of water. The expansion property of clays to ascertain whether they are included within the scope of the expression "expanding lattice clays" can be readily measured by standard X-ray diffraction techniques. The present invention does not apply to those clays that do not have expanding lattices, for example kaolinites are not included within the scope of the invention. Expanding lattice clays to which the invention applies are preferably capable of expanding in water to the extent of an increase of at least 5 Angstrom units (A.) in the c-axis spacing. The most preferred clays are those in which the c-axis spacing when saturated with water reaches a maximum greater than 25 Angstrom units. A brief comment on the characteristics of a typical expanding lattice clay, e. g., bentonite, may be helpful. The predominant mineral in bentonite clays is montmorillonite, a hydrous aluminosilicate consisting essentially of gibbsite, a hydrated aluminum oxide, condensed between two layers of silica. The platelet so formed has a thickness of about 10 Angstrom units and variable lateral dimensions of an average value in the neighborhood of 2,000 A. Variable proportions of the trivalent aluminum ions are replaced by divalent magnesium ions, or in other types of clays variable proportions of silicon are replaced by aluminum, giving rise to a negative charge on the platelet. This negative charge is satisfied by cations present in or on the plate surfaces. In the naturally occurring clays, these cations are metallic cations such as sodium, calcium, etc. If this external ion is sodium as in Wyoming bentonite, the clay swells strongly in water, a result believed to be due partly to the large increase in volume of the sodium ion upon hydration and also to hydration of the surface of the plate. If the ion is hydrogen, or calcium, or other polyvalent ion, the clays do not swell nearly so much in water, but are however still expanding lattice clays.

It is preferred that an expanding lattice clay to be used in practicing the invention be from a deposit which is essentially pure clay, or that it be subjected to known purification treatment to free it from non-clay materials and produce an essentially pure clay, e. g., a material which is at least 95 weight percent clay. A conventional treatment involves suspension of impure mined clay in water, settling of non-clay impurities (sand, silt, etc.) and a separation of the settled impurities from the clay suspension; such suspension can then be used directly for reaction with a proton donor polymer or the clay can be separated and dried for later use in reacting with a proton donor polymer.

A preferred type of proton donor polymer in this invention is that group of materials known generally as polyvinyl alcohols. Polymers of this type can be prepared by the hydrolysis of polyvinyl esters and usually contain some of the vinyl ester groups in unhydrolyzed form. Thus, a useful class of polymers can contain in polymeric form a large number of groupings resembling the monomeric substance from which the polymer was formed, for example vinyl acetate, vinyl propionate, vinyl butyrate. The polymer which is hydrolyzed to form the polyvinyl alcohol can be a homopolymer of a vinyl ester or it can be a copolymer of one or more vinyl esters with a substantial but usually minor proportion of another monomer copolymerizable therewith, for example acrylonitrile, acrylic acid, methacrylic acid, the alkyl esters of acrylic acid and methacrylic acid, vinyl chloride, vinylidene chloride, isobutylene, vinyl ethers, maleic acid, the mono- or dialkylmaleates, fumaric acid, the mono- or dialkylfumarates, and other monomers from which hydrolyzable copolymers can be prepared.

An essential requisite of the polymers and copolymers containing alcoholic hydroxyl substituents is water-solubility, and for this reason a substantial number of the alcoholic groups are required. Too few alcohol groups may result in water-insolubility, although water-solubility may also be influenced by the comonomer present in polymeric form. For example, acrylic acid, methacrylic acid, maleic acid, fumaric acid and the various vinyl alkyl ethers favor water-solubility, whereas the alkyl esters and hydrocarbons favor water-insolubility. The number of hydroxyl radicals present in the linear polymer chains may vary widely, and the maximum number required to induce sufficient water-solubility may also vary with the nature of the comonomer, the extent of hydrolysis of the polymeric vinyl ester and other chemical and physical characteristics of the polymers. It has been found that if the polymeric vinyl alcohol is at least partially water-soluble in either hot or cold water, it will be useful in the practice of this invention.

A class of compounds useful in the practice of this invention may be described by the structural formula:

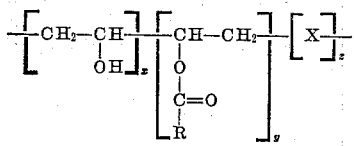

wherein R is a radical of the group consisting of hydrogen and alkyl radicals having up to 3 carbon atoms, X is a radical derived by polymerization of a monomer copolymerizable with the vinyl esters and $x$, $y$ and $z$ represent the relative proportions of vinyl alcohol, vinyl ester and other monomers, respectively, and $x+y+z=1$ (one). The X radical may vary from zero (0) to 20 percent of the total monomer in the copolymers, and $x$ will represent a substantial proportion of the monomers in the copolymer, preferably at least 50 percent, whereas $y$ is relatively smaller than $x$ and indicative of the unhydrolyzed ester present in the polymeric alcohol. Included among the compounds of the class described that are useful in the practice of this invention are those polyvinyl alcohols available as commercial polymers. Methods of preparing polyvinyl alcohols from polyvinyl acetate or other polymer or copolymer of vinyl esters are well-known to those skilled in the art.

Certain derivatives of polyvinyl alcohols are also useful. Particular attention is directed to the acetals, which are reaction products of polyvinyl alcohols with aldehydes, for example with acetaldehyde, butyraldehyde or other aldehydes especial preference being given to aliphatic aldehydes containing from 2 to 8 carbon atoms per molecule. Preferably the partial acetals, i. e., those prepared by reacting a polyvinyl alcohol material with less than the stoichiometric quantity of aldehyde that would be required for reaction with all hydroxyl groups on the polyvinyl alcohol, are used.

Another useful type of polymer includes those obtained by hydrolyzing polyvinylene carbonate or copolymers of vinylene carbonate with other copolymerizable monomers.

One method of preparing vinylene carbonate is chlorination of ethylene carbonate to form monochloroethylene carbonate, followed by dehydrochlorination of the latter by reaction with an amine resulting in vinylene carbonate. Properties of vinylene carbonate and methods of preparing same are described by Newman and Addor, Jour. Amer. Chem. Soc. 75, 1263, March 5, 1953. Vinylene carbonate has the structural formula:

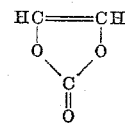

The repeating units of hydrolyzed polymers of vinylene carbonate are

Vinylene carbonate can be polymerized by itself or with a wide variety of other monomers copolymerizable therewith, for example those described above with reference to copolymers of vinyl acetate and other vinyl esters. The same methods of hydrolysis can be used on such homopolymers or copolymers of vinylene carbonate as are employed in hydrolyzing vinyl acetate polymers to form polyvinyl alcohols. Partially or completely hydrolyzed polymers of vinylene carbonate have a continuous linear carbon chain and are proton donors capable of reacting with expanding lattice clays by hydrogen bonding in the practice of the invention.

Other types of hydroxy-substituted continuous carbon chain polymers are also useful in the practice of this invention. By way of example can be mentioned homopolymers and copolymers of allyl alcohol and other hydroxy-olefins containing 3 or more carbon atoms per molecule. These polymers have hydroxyl groups attached to side-chain carbon atoms rather than to skeletal carbon atoms.

Hydroxylated vinyl polymers have been described hereinabove, which are proton donor polymers acting by hydrogen bonding to the surface of expanding lattice clays through hydrogen atoms of hydroxyl groups. Within the broad scope of the invention, it is not necessary that the hydrogen atom active in hydrogen bonding be part of a hydroxyl group, but rather it is only necessary that it be sufficiently labile to make the polymer a proton donor within the sense of the invention. For example, polyvinyl ethers are proton donors through the hydrogen atom on the alpha-carbon atom, i. e., the carbon atom attached to a carbon atom carrying an ether oxygen atom. Homopolymers and copolymers of methylvinyl ether, ethylvinyl ether, and other vinyl ethers, especially the alkylvinyl ethers, are most commonly employed.

Yet another type of continuous carbon chain polymer that acts as a proton donor in the practice of this invention is represented by homopolymers and copolymers of amides of unsaturated carboxylic acids, provided the polymerization is effected in such a way as to maintain protondoning amide groups or provided such groups are provided in the polymer by after reactions. Reference is made only to unsubstituted amides and mono-N-substituted amides. Homopolymers and copolymers of acrylamide, methacrylamide, crotonamide, their mono-N-substituted derivatives such as N-methylacrylamide, N-i-propylacrylamide, N-ethylmethacrylamide, and the like, having a hydrogen atom on the amide nitrogen capable of tying the polymer to an expanding lattice clay by hydrogen bonding can be employed to advantage. Especially preferred are polymers that have not undergone, during or after polymerization, chemical modification of a nature resulting in the formation of a polyelectrolyte.

Proton donor polymers to be employed in the present invention can be prepared directly by the polymerization or copolymerization of one or more organic monomers with aliphatic unsaturation if at least one of said monomers contains a group that is retained in the polymer as a proton doning group, e. g., —OH, —NH₂, etc. However, many types of proton donor polymers can be prepared by subsequent reactions of polymers and copolymers. In fact, vinyl alcohol per se is not a stable compound and polyvinyl alcohols must be prepared by after-reaction as explained herein. Those skilled in the art will understand how to effect desired after-treatment of polymers to provide polymers capable of reacting with expanding lattice clays by hydrogen bonding. Polymers and copolymers are identified herein in terms of monomeric constituents. However, it is to be understood that the names so applied refer to the molecular structure of the polymer and are not limited to the polymers prepared by the polymerization of specified monomers but also include polymers prepared from other monomers and converted by subsequent chemical reaction to the desired proton donor polymer as described herein.

The various proton donor polymers of the types described herein can be termed "ethylenic" polymers, i. e., polymers prepared by "vinyl polymerization," that is, prepared by polymerization of at least one monoolefinic compound through aliphatic unsaturation, said polymers having numerous side chains distributed along its substantially linear continuous carbon atom chain. Moderate branching and cross-linking of this chain are permissible. The side chains can be all of one type or can be of different types so long as some comprise proton donor groups. The length of the said continuous carbon chain is great and preferably is such as to provide polymers having a weight average molecular weight of at least 2,000. The continuous carbon chain is not easily broken because the carbon atoms therein enter into further reaction only with difficulty.

Proton donor polymers employed in the present invention may be water-soluble to the extent that they form apparently true homogeneous solutions or mixtures with water, or they may be more difficultly soluble polymers which expand in the presence of water and dissolve at least to some extent, and even included are some which are apparently insoluble in distilled water but which are capable of entering into hydrogen bonding reaction with expanding lattice clays.

Inasmuch as various procedures for effecting polymerization of ethylenically unsaturated monomers are so well-known in the art, it is not deemed necessary to go into much detail here. It will, of course, be understood that polymers obtained by various types of polymerization can differ quite considerably from each other and therefore will not be the full equivalents for all purposes to which the present invention may be put. It will suffice to say that it is possible to make proton donor polymers suitable for the practice of the present invention by all of the various known vinyl polymerization techniques. These include mass or bulk polymerization, wherein the reaction mixture is free from added solvent or other reaction medium and consists solely of monomers, resultant polymers and catalyst, if any. Alternatively, the polymerization can be carried out in water solution in the case of water-soluble monomers, in organic solvents in which either monomer or polymer or both are soluble, or can be effected by the suspension or emulsion polymerization techniques. For suspension polymerization a reaction medium such as water is used together with a small amount of a suspending agent, for example water-soluble vinyl acetate/maleic anhydride copolymer derivatives, carboxymethylcellulose, etc., to give a suspension of particles of initial monomeric mixture which particles grow in size as the polymerization proceeds yet are not of such small size as to result in a permanently stable latex. This is called "pearl" polymerization where the particles are of quite large size. Emulsion polymerization can be effected by employing water, a sufficient amount of emulsifying agent, for example a water-soluble salt of a sulfonated long chain alkyl aromatic compound or a surface active condensation product of ethylene oxide with long chain aliphatic alcohols or mercaptains, etc., along with vigorous agitation whereby an emulsion of the reactants in water is formed and the product is obtained in the form of a latex. Such latex can then be coagulated if desired by known methods and the polymer separated from the water.

Suitable catalysts for polymerization include the "per" compounds and the "azo" compounds. Furthermore, many polymerizations can be effected in the absence of any added catalysts, or can be promoted by ultraviolet irradiation. The peroxide-type and the azo-type polymerization catalysts are of the free-radical promoting type. Peroxide catalysts can be inorganic or organic, the latter having the general formula R'OOR" wherein R' is an organic radical and R" is an organic radical or hydrogen. These compounds are broadly termed "peroxides" and in a more specific sense are hydroperoxides wherein R" is hydrogen. By way of example of "per" compounds can be mentioned benzoyl peroxide, di-tertiary butyl peroxide, tertiary butyl hydroperoxide, cumene hydroperoxide, hydrogen peroxide, potassium persulfate, perborates, etc. Azo-type polymerization catalysts are characterized by the presence in the molecule of the group —N=N—; the dangling valences can be attached to a wide variety of organic radicals with each one however being preferably attached to a tertiary carbon atom. By way of example can be mentioned $\alpha,\alpha'$-azodiisobutyronitrile, diazonium halides, etc.

In making polyvinyl ethers, acidic polymerization catalysts are used, e. g., $AlCl_3$, $BF_3$, $SnCl_4$.

Probably the simplest method for preparing adducts of the present invention is by simply slurrying finely divided expanding lattice clay of the type desired in water together with the chosen proton donor polymer. An intimate admixture, as by vigorous stirring, should be assured. The resulting material is then dried by suitable means, for example drum drying or spray drying. The proton donor polymer may be completely water-soluble, or its solubility in water may be considerably limited, which is particularly the case of copolymers containing say 50 percent and above of non-proton donor monomers in the polymer molecule. In the case of such copolymers it may be necessary in some instances, especially with those with the smallest percentage of proton donor groups in the molecule, to intimately admix the polymer with the clay particles in the presence of water as by mixing in a kneader or ball-mill. Suitable temperatures, concentrations and times for effecting formation of the adducts will be greatly dependent upon the particular expanding lattice clay and the particular proton donor polymer. The most readily reactive materials can be adducted at essentially room temperatures, e. g., 20° C. In other instances it is desirable to increase the temperature substantially and to provide even several hours for sufficient reaction. Those skilled in the art, having been given the benefit of the present disclosure, will readily be able to determine by simple tests suitable conditions for effecting the adduct formation in any given situation.

Regardless of the preparation method, the adducts should be used in the form of fine particles, preferably not larger than 100 mesh, i. e., not more than 1 percent retained on a No. 100 U. S. Standard Sieve. Drying of products made by wet methods usually causes formation of lumps, so that a final grinding step is desirable. The finished, isolated product is a non-aggregated finely divided pulverulant reaction product or adduct. In some instances it might be possible to use the adduct in other than finely divided form where the subsequent manufacturing step or steps, e. g. blending the adduct with other materials by milling or otherwise, results in breaking up of adduct particles so that it is ultimately in finely divided form.

Relative proportions of proton donor polymer and expanding lattice clay to be used can be varied over a considerable range, and will be dependent to a considerable extent upon the ultimate use for which the adduct is intended. In any event, it is preferred to employ at least sufficient proton donor polymer to expand the clay lattice to a significant extent, as determined by the difference between the c-axis spacing of the original expanding lattice clay and the adducts made therefrom. It is apparent that the weight per cent organic material in the final product can vary over a great range, but it should preferably be at least 3 weight percent and usually considerably more, for example 10 percent or more for most uses.

Products of the present invention have many uses. For example, bentonite films have long been known. Films made from bentonite-proton donor polymer adducts are more stable towards water. The character of the particular proton donor polymer, as well as the quantity thereof, of course will greatly influence the character of the final adduct. Those proton donor polymers containing a large number of hydroxyl groups, as polyvinyl alcohol, will in general form adducts with expanding lattice clays that are less hydrophobic than those prepared from polymers whose proton donor capacity is the result of groups other than hydroxyl. Many uses for adducts prepared according to the present invention will be evident. For example, capsules for medicinal or other purposes can be prepared from these adducts alone or in admixture with gelatin or the like, the rate of disintegration of the capsule in water being determined by the particular adduct chosen and a wide range of such disintegration periods thus being made available. As another example paper can be made water-resistant by coating with adducts of an expanding lattice clay and one of the more hydrophobic proton donor polymers.

The following examples set forth some of the preferred methods for practicing the invention. It will be understood, of course, that numerous variations in the materials, the proportions and procedures can be made without departing from the invention. Parts are by weight unless otherwise stated.

Example 1

One part bentonite clay, 100 parts water and 0.1 part polyvinyl alcohol were slurried in a Waring Blendor for 1 hour, heated over a water bath for 2 hours, shaken 2 hours, centrifuged and the solids washed, evaporated and dried in a vacuum desiccator over $P_2O_5$.

The c-axis spacing of the thus-prepared adduct was 18.9 A. (untreated bentonite is about 9.7 A.).

Example 2

Two parts bentonite clay, 1 part polyvinyl alcohol, and 300 parts water were slowly evaporated to dryness on a steam bath, resulting in formation of a thin film which was more waterproof than was a film formed in the same manner from bentonite without polyvinyl alcohol.

The c-axis spacing of this adduct was 18.7 A.

Example 3

A mixture of 250 grams of polyvinyl alcohol and 5.9 pounds of Wyoming bentonite in distilled water was mixed for 1 hour in a Baker-Perkins mixer. The resulting paste was dried in a vacuum tray drier for 44 hours at 80° C. and 25 inches Hg vacuum. The dry material was Mikropulverized and sieved through a 170-mesh screen.

Carbon content of the product: theoretical 5.22 weight percent; by analysis 5.35 weight percent.

In parallel tests, 0.1 gram of the product was mixed with 0.5 ml. toluene containing 3 percent methanol, or with 0.5 ml. nitrobenzene. Tendency towards swelling was noted. Then 0.5 ml. distilled water was added in each case, and the resulting mixture shaken. The action of the solid with respect to the two phases (water phase and organic phase) was then noted. The bentonite-polyvinyl alcohol product exhibited at most only a very slight swelling in the toluene-methanol and in the nitrobenzene. With each of these on adding water the solid went into the water phase forming a thick paste. However, some of the solid remained at the interface and on further dilution and shaking stable emulsions were formed. Thus, this product was somewhat surface active.

While the invention has been described with particular reference to various preferred embodiments thereof, it will be appreciated that variations from the details given herein can be effected without departing from the invention in its broadest aspects.

I claim:

1. An adduct of an expanding lattice clay with at least 10 weight percent, based on said adduct, of a proton donor synthetic high polymer containing a substantially linear molecular chain derived by the polymerization of at least one monoolefinic compound through aliphatic unsaturation, said adduct having been obtained by reacting said clay with said polymer in the presence of a reaction medium consisting of water so that said polymer is tied to the surfaces of said clay by hydrogen bonding through labile hydrogen atoms of said polymer.

2. An adduct of an expanding lattice clay with at least 3 weight percent, based on said adduct, of a proton donor synthetic high polymer containing a substantially linear molecular chain derived by the polymerization of at least one monoolefinic compound through aliphatic unsaturation, said adduct having been obtained by reacting said clay with said polymer in the presence of a reaction medium consisting of water so that said polymer is tied to the surfaces of said clay by hydrogen bonding through labile hydrogen atoms of said polymer.

3. An adduct of an expanding lattice clay with at least 3 weight percent, based on said adduct, of a synthetic high polymer containing a substantially linear molecular chain derived by the polymerization of at least one monoolefinic compound through aliphatic unsaturation and containing sufficient hydroxyl groups to effect reaction of said high polymer with surfaces of said expanding lattice clay through hydrogen bonding, said adduct having been obtained by reacting said clay with said polymer in the presence of a reaction medium consisting of water.

4. An adduct of an expanding lattice clay with at least 3 weight percent, based on said adduct, of a polyvinyl alcohol containing sufficient hydroxyl groups to effect reaction of said polyvinyl alcohol with surfaces of said expanding lattice clay through hydrogen bonding, said adduct having been obtained by reacting said clay with said polyvinyl alcohol in the presence of a reaction medium consisting of water.

5. An expanding lattice clay that has been reacted, in the presence of a reaction medium consisting of water, with an amount of a polyvinyl alcohol that is at least 3 weight percent based on said clay plus polyvinyl alcohol and sufficient to effect substantial expansion of the lattice of said clay, said polyvinyl alcohol containing sufficient hydroxyl groups to effect reaction of said polyvinyl alcohol with surfaces of said expanding lattice clay through hydrogen bonding.

6. An adduct of an expanding lattice clay with at least 3 weight percent, based on said adduct, of a polyvinyl ether, said adduct having been obtained by reacting said clay with said polyvinyl ether in the presence of a reaction medium consisting of water so that said polyvinyl ether is tied to the surfaces of said clay by hydrogen bonding through labile hydrogen atoms of said polyvinyl ether.

7. An adduct of an expanding lattice clay with at least 3 weight percent, based on said adduct, of a hydrolyzed polyvinylene carbonate containing sufficient hydroxyl groups to effect reaction of said hydrolyzed polyvinylene carbonate with surfaces of said expanding lattice clay through hydrogen bonding, said adduct having been obtained by reacting said clay with said hydroylzed polyvinylene carbonate in the presence of a reaction medium consisting of water.

8. An adduct of a bentonite and an amount, at least 3 weight percent based on said adduct and sufficient to expand the lattice of said bentonite, of a proton donor synthetic high polymer containing a substantially linear molecular chain derived by the polymerization of at least one monoolefinic compound through aliphatic unsaturation, said adduct having been obtained by reacting said bentonite with said polymer in the presence of a reaction medium consisting of water so that said polymer is tied to the surfaces of said bentonite by hydrogen bonding through labile hydrogen atoms of said polymer.

9. An adduct of an expanding lattice clay with at least 3 wight percent, based on said adduct, of a polyvinyl alcohol having at least 50 percent of the vinyl groups in the polymer substituted by an —OH group, said adduct having been obtained by reacting said clay with said polyvinyl alcohol in the presence of reaction medium consisting of water so that said polyvinyl alcohol is tied to the surfaces of said clay by hydrogen bonding through —OH groups of said polyvinyl alcohol.

10. An adduct of an expanding lattice clay and an amount, at least 3 weight percent based on said adduct and sufficient to expand the lattice of said clay, of a proton donor synthetic high polymer containing a substantially linear molecular chain derived by the polymerization of at least one monoolefinic compound through aliphatic unsaturation and having a molecular weight of at least 10,000, said adduct having been obtained by reacting said clay with said polymer in the presence of a reaction medium consisting of water so that said polymer is tied to the surfaces of said clay by hydrogen bonding through labile hydrogen atoms of said polymer.

11. A finely divided adduct of a substantially pure expanding lattice clay and an amount, at least 3 weight percent based on said adduct and sufficient to decrease the hydrophilic nature of said clay, of a proton donor synthetic high polymer containing a substantially linear molecular chain derived by the polymerization of at least one monoolefinic compound through aliphatic unsaturation, said adduct having been obtained by reacting said clay with said polymer in the presence of a reaction medium consisting of water so that said polymer is tied to the surfaces of said clay by hydrogen bonding through labile hydrogen atoms of said polymer.

12. A process which comprises reacting, in the presence of a reaction medium consisting of water, an expanding lattice clay with a quantity of a proton donor synthetic high polymer containing a substantially linear molecular chain derived by the polymerization of at least one monoolefinic compound through aliphatic unsaturation sufficient to form an adduct of said proton donor polymer with said clay having in the dried state a greater $c$-axis spacing than that of said clay in the dried state, said quantity of polymer being at least 3 weight percent based on said adduct.

13. A process which comprises reacting, in the presence of a reaction medium consisting of water, a swelling bentonite with a proton donor synthetic high polymer containing a substantially linear molecular chain derived by the polymerization of at least one monoolefinic compound through aliphatic unsaturation and having sufficient labile hydrogen atoms to form an adduct of said proton donor polymer with said bentonite having in the dried state a greater $c$-axis spacing than that of said bentonite in the dried state, said proton donor polymer being employed in an amount of at least 10 weight percent based on said adduct.

14. A process which comprises reacting, in the presence of a reaction medium consisting of water, an expanding lattice clay with a water-soluble polyvinyl alcohol in an amount sufficient to form an adduct of said polyvinyl alcohol with said clay having in the dried state a greater $c$-axis spacing than that of said clay in the dried state, said amount being at least 3 weight percent based on said adduct.

References Cited in the file of this patent

UNITED STATES PATENTS

| | | |
|---|---|---|
| 2,251,296 | Shipp | Aug. 5, 1941 |
| 2,300,074 | Strain | Oct. 27, 1942 |
| 2,401,348 | Hauser et al. | June 4, 1946 |
| 2,652,379 | Hedrick et al. | Sept. 15, 1953 |
| 2,666,719 | Lissan | Jan. 19, 1954 |

OTHER REFERENCES

U. S. Department of Interior, Technical Paper 609, entitled "Bentonite: Its Properties, Mining, Preparation, and Utilization," by Davis et al. (1940), page 41.